May 2, 1961        P. R. CAMP        2,982,856
TUNABLE INFRARED APPARATUS AND METHODS
Filed June 27, 1955
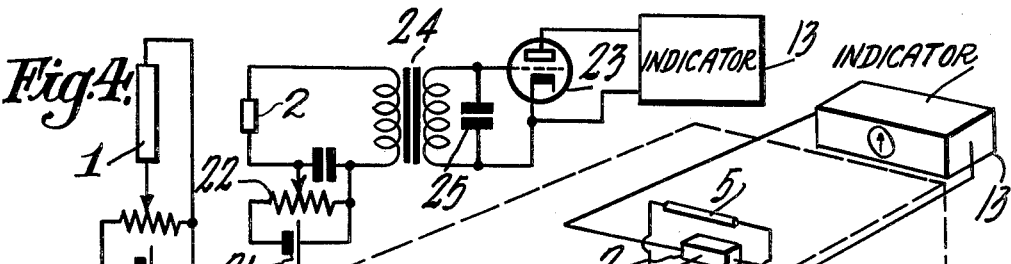
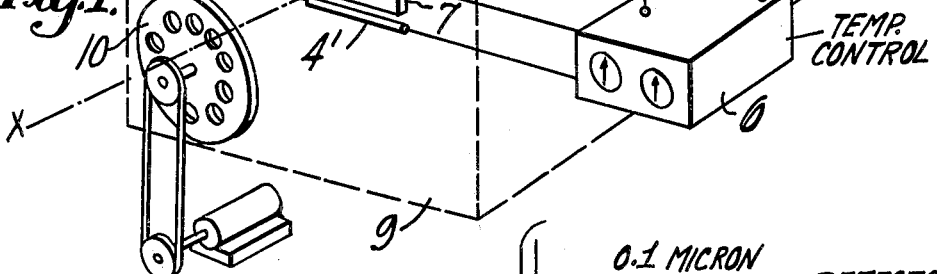
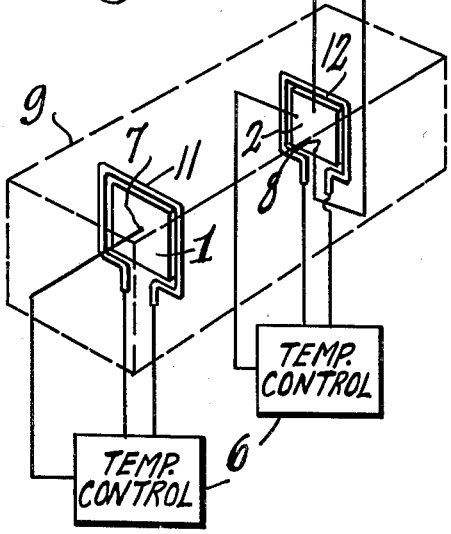
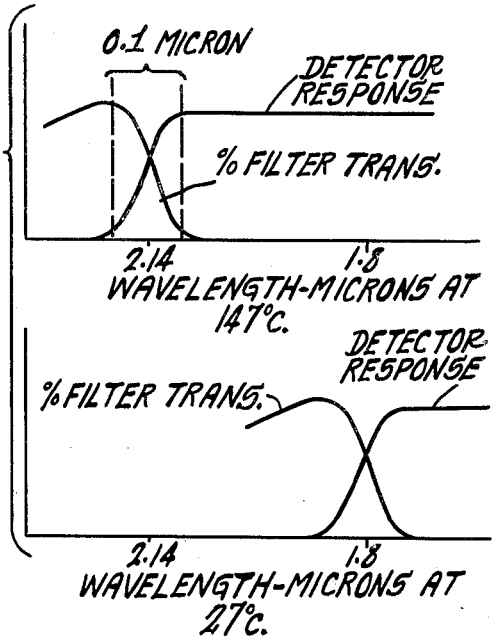
INVENTOR.
Paul R. Camp
BY
ATTORNEY

United States Patent Office 2,982,856
Patented May 2, 1961

2,982,856

TUNABLE INFRARED APPARATUS AND METHODS

Paul R. Camp, Middletown, Conn., assignor to Radio Corporation of America, a corporation of Delaware Filed June 27, 1955, Ser. No. 518,093

6 Claims. (Cl. 250—83.3)

This invention relates generally to improved methods and apparatus for detecting infrared radiation. More specifically, the invention relates to improved infrared filters and detectors and the combination thereof which are tunable to a selected infrared wavelength band.

Infrared radiation detectors have been known for detecting radiation emanating from various bodies which, by virtue of their temperature, behave as sources of heat radiation.

It is an object of the present invention to provide an improved radiant energy detector which is responsive to a given wavelength band.

A further object of the invention is to provide an improved infrared radiation detector which is tunable to a given wavelength band.

Another object of the invention is to provide an improved infrared radiation filter the band pass characteristic of which is thermally controllable.

A further object of the invention is to provide an improved infrared radiation detector the wavelength response characteristic of which is thermally controllable.

Another object of the invention is to provide improved methods of and apparatus for thermally tuning an infrared detector system.

Another object is to provide improved semi-conductor infrared radiation filters and detecting apparatus.

These and other objects of the invention are accomplished by employing semi-conductive elements the wavelength response characteristics of which are temperature-dependent. The transmission of infrared wavelengths through a semi-conductive filter element depends upon the temperature of the element. At a given temperature this transmission sharply cuts off at wavelengths shorter than a given wavelength. For example, such a filter can be made to pass infrared wavelengths longer than 1.8 microns at a temperature of 27° C. Changing the temperature of the element causes the wavelength transmission cut-off point or band edge to shift. In general, as the temperature is increased, only radiant energy of relatively longer wavelengths is passed so that at 147° C. only wavelengths of 2.14 microns and longer are passed. The detection response to infrared wavelengths by a semi-conductive detector element also depends upon the temperature of the element. At a given temperature this response abruptly cuts off for wavelengths longer than a given wavelength. For example, such a detector can be made to detect infrared wavelengths shorter than 1.8 microns at a temperature of 27° C. Changing the temperature causes the wavelength response cut-off point or band edge to shift. In general, as the temperature is increased, the longer the wavelengths that are detected so that at 147° C. wavelengths of 2.14 microns and shorter are detected. Thus, by combining a semi-conductive filter with a semi-conductor cell and causing the wavelength transmission and detection response band edges to overlap by adjusting the temperatures of the filter and cell, all wavelengths shorter than the cut-off wavelength are stopped by the filter and all wavelengths longer than the cut-off wavelength of the cell are not detected by the cell. Hence, the combination of the filter and the detector cell provides a response to only the particular wavelength band defined by the overlapping cut-off wavelengths. Furthermore, the overlapping transmission and detection band edges can be shifted to tune the device to a desired wavelength in a given range.

The invention will be described in greater detail with reference to the drawings in which similar reference characters are applied to similar elements, and in which:

Figure 1 is a partially schematic view in perspective of one embodiment of the invention;

Figure 2 is a graphic representation of the transmission and detection response characteristics of semi-conductive materials according to the invention;

Figure 3 is a partially schematic view in perspective of another embodiment of the invention; and Figure 4 is a schematic view of another embodiment of the invention showing an alternative heating arrangement.

Referring to Figure 1, an infrared detecting system includes a semi-conductive filter 1, which may be of germanium. The filter comprises, for example, a wafer of the order of 1 mm. in thickness and about 3 to 4 square centimeters in area. If thinner wafers are employed, a less steep transmission band edge will result. The square shape of the filter is not critical and is shown thus only for convenience of illustration. The system also includes an infrared detector cell 2, which may operate as a photo-voltaic cell, photo-conductive cell, photo-diode, or photo-transistor, and comprises a semi-conductive body, which may be of germanium, of the order of 1 mm. in thickness and about 1 square centimeter in area, for example. The area and shape of the cell 2 are not critical and may be varied as desired. The distance between the filter and the detector cell is not critical except that it should be great enough to insure that they are thermally isolated one from the other. Since the operating characteristics of each unit are temperature-dependent and each may be heated to different temperatures, the units should not be so close to each other as to permit one to be affected by the heating of the other. However, in the event that spacing cannot be relied upon to provide thermal isolation of the units, heat-insulating filters (not shown) which are transparent to the infrared wavelengths to be detected may be inserted between the filter and detector.

The filter 1 is adapted to be heated by means of the electrical resistance elements 4 and 4' which may be located above and below the filter as shown. Any conveniently controllable heat source may be employed. The detector cell 2 is likewise heated by any convenient heat source such as the electrical resistance elements 5 and 5'. The heating elements are connected to a source of electrical energy (not shown) which may include a temperature control apparatus 6. The temperature of the filter and detector cell may be detected by means of thermocouples 7 and 8 in contact with the filter and cell, respectively. The thermocouples 7 and 8 are connected to the temperature control apparatus 6 which comprises, for example, separate amplifiers and balancing circuits, fed by the respective thermocouples for the filter and cell, to regulate the heater current supplied to the heaters 4 and 5.

The filter 1 and the detector cell 2 as well as their respective heaters may be enclosed in a heat insulating or vacuum chamber 9 (indicated by dotted lines) to prevent ambient temperature changes and loss of temperature control. The chamber may be provided with an infrared transparent window 3 to admit infrared radiation. Such a window may be constituted of rock salt, for example.

The detector cell 2 is connected, for example, to a meter 13 which indicates the output intensity of the cell. In the embodiment illustrated by Figure 1 the infrared detecting device according to the invention is arranged to operate by modulating the infrared radiation by means of the light chopper 10 to produce an A.C. output from the detector cell 2. In this case the A.C. output of the cell is amplified and then fed to the meter. In order to enhance the rejection of the infrared noise which may arise from the heating system the amplifier should be tuned to the light chopper modulating frequency. It should be understood that the invention may also be adapted for D.C. operation by omitting the light chopper 10 and connecting the cell 2 to a galvanometer or similar D.C. measuring instrument. As will be more fully explained hereinafter the device is tuned to the desired infrared wavelength by heating the filter 1 and the detector 2 to particular temperatures which establish the desired wavelength response characteristics. When infrared radiations of the thus established responsive wavelength are received, the meter indicates such reception and the intensity thereof.

The operation of the embodiment shown in Figure 1 will be explained in connection with the representation of the response characteristics of the filter and detector cell as shown in Figure 2. Infrared radiations from a source X are focused through the light chopper 10 and the infrared transparent window 3 onto the filter 1. At a given temperature the semi-conductive filter will be opaque to wavelengths below the band edge and transparent to a wide range of wavelengths above the band edge. At a temperature of 147° C. this band edge occurs at a wavelength of about 2.14 microns. At a temperature of 27° C. the filter band edge occurs at about 1.8 microns. Thus by varying the temperature of the filter between 27° C. and 147° C. the wavelength pass band edge of the filter can be shifted from 1.8 to 2.14 microns.

Infrared wavelengths passed by the filter 1 above the temperature-dictated minimum wavelength then fall upon the semi-conductive detector cell 2. At a given temperature the detector cell will respond to substantially all infrared wavelengths up to a maximum wavelength beyond which its response will fall off very sharply. Thus, a detector cell is selected, for example, which at a temperature of 147° C. responds to wavelengths shorter than but including 2.14 microns and substantially none longer. At a temperature of 27° C. the cell responds to wavelengths shorter than but including 1.8 microns and substantially none longer. Thus by varying the temperature of the cell between 27° C. and 147° C. the wavelength detection band edge of the cell can be shifted from 1.8 to 2.14 microns.

Thus the filter and cell operate in combination to cut off transmission and response to wavelengths longer and shorter than a given wavelength band and this given wavelength band may be varied over a given range by varying the temperature of the filter and cell. Thus with a filter and detector temperature of 147° C. the infrared detector according to the invention will provide an output response only to an infrared wavelength in the neighborhood of 2.14 microns, and at a filter and detector temperature of 27° C. to an infrared wavelength in the neighborhood of 1.8 microns. By concomitantly varying the temperatures between these extremes the device may be tuned to infrared wavelengths between 1.8 and 2.14 microns.

As shown in Figure 2 the temperatures of the filter and detector cell are so adjusted so that the combination as a whole has a bandwidth of about a tenth of a micron. This bandwidth can be increased or decreased by varying the temperature of either the filter or the detector cell. If the temperature of the detector cell is held constant and the temperature of the filter is increased then the bandwidth decreases. On the other hand a decrease in filter temperature results in an increase in bandwidth. Conversely if the temperature of the filter is held constant and the temperature of the detector cell is varied, the bandwidth will increase and decrease with an increase or decrease, respectively, in temperature. Thus the sharpness of the tunable bandwidth can also be precisely controlled according to the invention.

Referring now to Figure 3 another embodiment of the invention is disclosed wherein the filter 1 and detector cell 2 are heated by electrical induction coils 11 and 12, respectively. By selecting germanium for the semi-conductive elements constituting the filter and detector cell, a sufficiently electrically conductive medium is provided that is capable of being heated inductively. In this embodiment the filter 1 and detector cell 2 are shown as being of identical shape and size. Furthermore, in this embodiment the detector functions as a D.C. rather than A.C. device. The filter and detector cell are enclosed in a heat-insulating chamber which may also be evacuated.

By inductively heating the semi-conductive elements, the filter and detector cell can be held to much more uniform temperatures since the whole filter and the whole detector cell constitute their own heat sources, there being less of a temperature gradient across the filter and the cell. Furthermore, temperatures can be controlled with more precision and with less time lag by inductive heating than otherwise.

Heating means other than electrical resistance or inductive elements can be employed. For example, as shown in Figure 4, the filter 1 may be conductively heated by passing a current therethrough. The detector cell 2 may likewise be so heated although greater precautions must be taken in this instance to prevent spurious output signals from appearing at the indicator arising from the heating current in the cell. Referring more particularly to Figure 4, the detector cell 2, adapted for A.C. operation as in Figure 1, is connected in series with a source of D.C. such as the battery 21, for example. The current supplied to the cell may be regulated by means of the variable resistance 22 so as to regulate the temperature of the detector cell. The resistance element 22 may be adapted to be controlled by means of a thermocouple and relay (not shown), for example, to provide automatic temperature regulation. The D.C. heating current is isolated from the amplifier 23 and the indicator by means of the iron-core coupling transformer 24. The amplifier 23 is tuned by means of the capacitor 25 to the light-chopper modulating frequency as is well known in the art. By such an arrangement the heating current and noise arising from local infrared wavelengths due to heating may be effectively isolated from the indicator which will now only indicate infrared wavelengths which have been received from outside the system and modulated by the light-chopper.

There thus has been shown and described a novel tunable infrared detector system. While certain specific embodiments of the invention have been set forth, it is to be understood that the practice of the invention is not limited thereto. In addition to a choice of heating arrangements, a variety of heat insulating techniques are available and other shapes, sizes, and arrangements of the filter and detector cell may be devised without departing from the scope of the invention. Furthermore while the embodiments of the invention described employ semi-conductive germanium, this is by no means the only semi-conductive material which may be used in the practice of the invention. Silicon, indium phosphide, and other intermetallic semi-conductive compounds are examples of other suitable materials.

What is claimed is:

1. An infrared radiation detector comprising a filter having a transmission characteristic which cuts off abruptly in a given wavelength region, a detector which responds to only an end portion of the wavelengths transmitted by said filter, the transmission cut off of said filter and the response cut off of said detector being thermally controllable, and thermal means for controlling at least one of said transmission and response characteristics.

2. An infrared radiation detector comprising a filter having a transmission characteristic which cuts off abruptly in a given wavelength region, a detector which responds to only an end portion of the wavelengths transmitted by said filter, the transmission cut off of said filter and the response cut off of said detector being thermally controllable, and thermal means for simultaneously controlling both said cut-off transmission and response characteristics.

3. A tunable infrared radiation detector comprising in combination a semi-conductive filter which at a given temperature is substantially transparent to infrared radiation of wavelengths longer than a particular minimum wavelength and opaque to wavelengths shorter than said particular minimum wavelength, a semi-conductive detector cell which at a given temperature detects infrared radiation of wavelengths shorter than a particular maximum wavelength, said particular minimum wavelength and said particular maximum wavelength being temperature dependent, and said minimum wavelength being shorter than said maximum wavelength; thermal control means for said filter and said detector cell whereby said minimum and maximum wavelengths can be shifted throughout a given wavelength range so as to tune said radiation detector to infrared radiation wavelengths lying between said minimum and maximum wavelengths.

4. The invention according to claim 3 wherein said thermal control means include electrical resistance elements in thermal transmission relationship with at least one of said filter and said detector cell.

5. The invention according to claim 3 wherein said thermal control means include means for inductively heating at least one of said filter and said detector cell.

6. The invention according to claim 3 wherein said thermal control means include means for conductively heating at least one of said filter and detector cell.

References Cited in the file of this patent

UNITED STATES PATENTS

| | | |
|---|---|---|
| 2,547,173 | Rittner | Apr. 3, 1951 |
| 2,650,311 | Bray | Aug. 25, 1953 |
| 2,692,950 | Wallace | Oct. 26, 1954 |

OTHER REFERENCES

Denmark et al.: "Optimum Grain Size in the Christiansen Filter," Journal of Optical Society, v. 25, No. 10, pages 330–331, October 1935.